(12) United States Patent
Shin et al.

(10) Patent No.: US 8,300,902 B2
(45) Date of Patent: Oct. 30, 2012

(54) APPARATUS FOR DISTINGUISHING FORGED FINGERPRINT AND METHOD THEREOF

(75) Inventors: Yo-shik Shin, Seoul (KR); Geum-yong Kim, Seoul (KR)

(73) Assignee: Union Community Co., Ltd., Seoul (KR)

( * ) Notice: Subject to any disclaimer, the term of this patent is extended or adjusted under 35 U.S.C. 154(b) by 1045 days.

(21) Appl. No.: 12/254,471

(22) Filed: Oct. 20, 2008

(65) Prior Publication Data
US 2010/0098302 A1 Apr. 22, 2010

(51) Int. Cl.
*G06K 9/00* (2006.01)
(52) U.S. Cl. ......... 382/124; 382/115; 382/116; 382/125
(58) Field of Classification Search .................. 382/153, 382/125, 124, 118, 116, 115
See application file for complete search history.

(56) References Cited

U.S. PATENT DOCUMENTS

| 4,015,240 | A | * | 3/1977 | Swonger et al. | 382/125 |
| 5,077,803 | A | * | 12/1991 | Kato et al. | 382/124 |
| 5,815,598 | A | * | 9/1998 | Hara et al. | 382/211 |
| 6,282,304 | B1 | * | 8/2001 | Novikov et al. | 382/125 |
| 6,657,614 | B1 | * | 12/2003 | Ito et al. | 345/168 |
| 2002/0031245 | A1 | * | 3/2002 | Rozenberg et al. | 382/125 |
| 2003/0025897 | A1 | * | 2/2003 | Iwai | 356/71 |
| 2006/0215887 | A1 | * | 9/2006 | Nishimura et al. | 382/124 |
| 2008/0123908 | A1 | * | 5/2008 | Waldman et al. | 382/124 |

* cited by examiner

*Primary Examiner* — Vu Le
*Assistant Examiner* — Aklilu Woldemariam
(74) *Attorney, Agent, or Firm* — Stein McEwen, LLP

(57) ABSTRACT

An apparatus for distinguishing forged fingerprint and a method thereof are disclosed. A different threshold angle for total reflection is applied when forged fingerprint is touched on a fingerprint input surface of a prism, and the forged fingerprint distinguishing apparatus and method use the above fact. Accordingly, using a separate light source, from which a ray of light is emitted with a light axis at a predetermined range of incident angle, acquired fingerprint image is compared and it is determined whether the fingerprint image corresponds to authentic fingerprint or forged one.

14 Claims, 7 Drawing Sheets

APPARATUS FOR DISTINGUISHING FORGED FINGERPRINT AND METHOD THEREOF

BACKGROUND OF THE INVENTION

1. Field of the Invention

The present invention relates to a fingerprint recognition apparatus for distinguishing forged fingerprint and a method thereof, and more particularly, to a forged fingerprint distinguishing apparatus for distinguishing forged fingerprint such as the one on paper or film from a human biological fingerprint and a method thereof.

2. Description of the Related Art

Biometric information has been widely used for user authentication of the information device for its unchangeable features and uniqueness, and specifically, fingerprint recognition has gained growing attention and popularity than the other schemes due to its simpler structure and yet superior performance.

Generally, a user authentication is used in the fields that require high security such as access control, e-business, financial transaction, or securing documents or files on personal computer (PC) or confidential data of the company. Therefore, it is most important that the user authentication distinguishes artificially forged fingerprint ('forged fingerprint') from authentic human fingerprint efficiently.

One of the ways to forge fingerprint is to apply or coat transparent liquid such as water or oil on a paper sheet or a film printed with a fingerprint thereon, and bring this into a contact with a fingerprint recognition device. Most of the conventional fingerprint recognition devices perceive such forged fingerprints and so process authentication.

FIGS. 1A and 1B show fingerprint images acquired through a conventional fingerprint recognition device, in which FIG. 1A is acquired from the authentic fingerprint and FIG. 1B is acquired from the forged fingerprint described above. FIGS. 1A and 1B are similar to each other.

One could put the above forged fingerprint on his fingertip, and in this case, the forged fingerprint can hardly be distinguished by the known fingerprint distinguishing technologies such as temperature detection, pulse detection, pressure detection, blood flood detection, or sweat gland detection.

SUMMARY OF THE INVENTION

Accordingly, the present invention has been made keeping in mind the above problems occurring in the prior art and an object of the present invention is to provide a forged fingerprint distinguishing apparatus capable of distinguishing forged fingerprint from authentic fingerprint and a method thereof.

In order to accomplish the above object, the present invention provides a method of distinguishing forged fingerprint for determining whether an object touched on a fingerprint input surface of a prism is authentic fingerprint or forged one, by acquiring a fingerprint image of the touched object, which comprises emitting a ray of light having a light axis at a predetermined incident angle onto the fingerprint input surface, wherein the predetermined incident angle is larger than a first threshold angle for total reflection and smaller than a second threshold angle for total reflection, the first threshold angle for total reflection being applied when the object has a reflective index of 1, and the second threshold angle for total reflection being applied when a transparent liquid is touched on the fingerprint input surface, acquiring a fingerprint image of the object which is formed by the emitted ray of light, computing an area of the acquired fingerprint image; and determining the object to be authentic fingerprint if the computed area of the fingerprint image is larger than a reference area, and determining the object to be forged one if the computed area of the fingerprint image is smaller than the reference area.

The area of the fingerprint image may be computed by obtaining the number of pixels which have gray levels greater than a predetermined reference value, in an entire image that includes the acquired fingerprint image.

Alternatively, instead of obtaining the area of the acquired fingerprint image to distinguish forged fingerprint, an average gray level of an entire image that includes the acquired fingerprint image or that of a predetermined part of the entire image may be computed to determine the object to be authentic fingerprint if the computed average gray level is larger than a reference value, or determine the object to be forged one if the computed average gray level is smaller than the reference value.

The second threshold angle for total reflection may be applicable when the transparent liquid is water. The predetermined incident angle may desirably be an intermediate angle between the first and second threshold angles.

In order to accomplish the above object, the present invention further provides an apparatus for distinguishing forged fingerprint, which includes a light refractor, an authentic fingerprint distinguishing light source, an optical lens, an image sensor and a forged fingerprint distinguishing unit.

The light refractor includes a fingerprint input surface on which an object for acquiring a fingerprint image is touched, and a light emitting surface from which the fingerprint image is emitted.

The authentic fingerprint distinguishing light source is provided to emit a ray of light in a manner such that the emitted ray of light has a light axis at a predetermined incident angle with respect to the fingerprint input surface. The predetermined incident angle is larger than a first threshold angle for total reflection and smaller than a second threshold angle for total reflection, in which the first threshold angle is applied when the object has a reflective index of 1, and the second threshold angle for total reflection is applied when a transparent liquid is touched on the fingerprint input surface.

The optical lens is provided adjacent to the light emitting surface to focus the fingerprint image being emitted from the light refractor, and the image sensor acquires the fingerprint image focused on the optical lens.

The forged fingerprint distinguishing unit computes an area of the fingerprint image acquired by the image sensor, and determines the object to be authentic fingerprint if the computed area of the fingerprint image is larger than a reference area, or determines the object to be forged one if the computed area of the fingerprint image is smaller than the reference area.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

The preferred embodiments of the present invention will be explained in greater detail below with reference to the accompanied drawings.

Figure 1A:
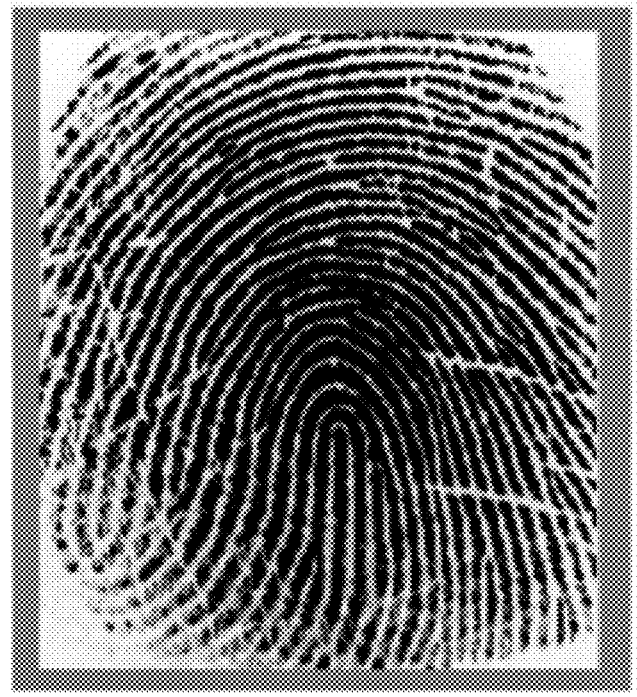
FIGS. 1A and 1B show fingerprint images acquired through a conventional fingerprint recognition apparatus.
Figure 1B:
Figure 2:
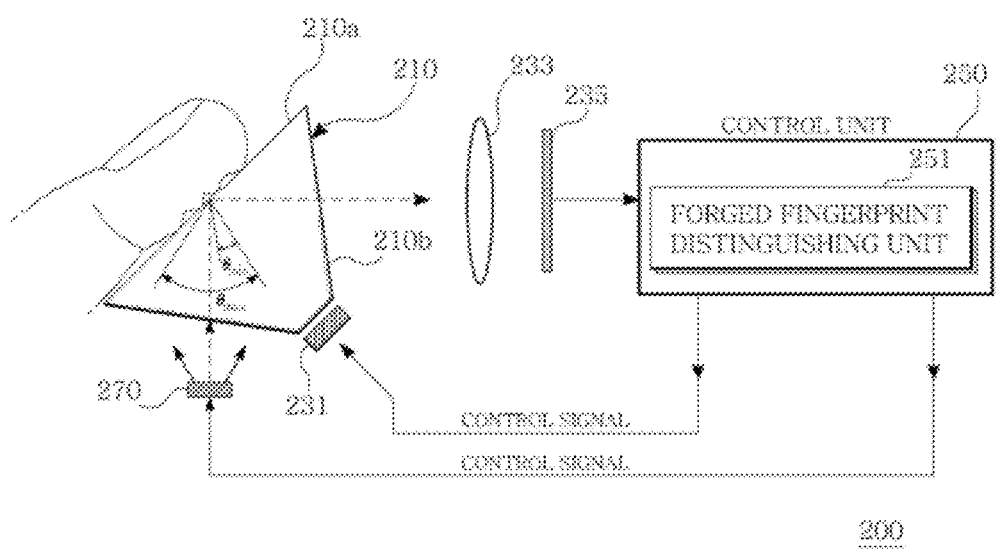
FIG. 2 is a block diagram of an optical fingerprint recognition apparatus equipped with a forged fingerprint distinguishing apparatus according to an embodiment of the present invention.

FIG. 2 is a block diagram of an optical fingerprint recognition apparatus equipped with a forged fingerprint distinguishing apparatus according to an embodiment of the present invention. Accordingly, the fingerprint recognition apparatus 200 of FIG. 2 is embodied to include a forged fingerprint distinguishing apparatus according to an embodiment of the present invention.

Referring to FIG. 2, the fingerprint recognition apparatus 200 includes a prism 210, an internal light source 231 to emit a ray of light toward the prism 210 to perceive fingerprint, an optical lens 233 to focus the fingerprint image, an image sensor 235, a control unit 250, and an authentic fingerprint distinguishing light source 270.

The prism 210 includes a fingerprint input surface 210a on which fingerprint is placed, and a light emitting surface 210b through which a ray of light reflected or diffused from the fingerprint input surface 210a is emerged. As shown in FIG. 2, the prism 210 may be formed to have three faces (triangular shape) as well as four faces (trapezoidal shape) when viewed in section (or when an optically unusable surface is excluded), or alternatively, yet broader sense of the prism 210, such as a light refractor, may be used instead.

First, the basic process of recognizing fingerprint in the optical fingerprint recognition apparatus 100 of FIG. 2 will be explained below.

When fingerprint is touched on the fingerprint input surface 210a, a ray of light emitted from the internal light source 231 is passed through the fingerprint input surface 210a and the light emitting surface 210b of the prism 210, converged on the optical lens 233 and inputted to the image sensor 235. In the diffusive fingerprint recognition apparatus 200 such as the one shown in FIG. 2, the ray of light emitted from the internal light source 231 enters the fingerprint input surface 210a at right angles or at a smaller angle than a total reflection threshold. The emitted light ray from the internal light source 231 may be passed through or diffused according to the valleys and ridges of the fingerprint touching on the fingerprint input surface 210a, to form a corresponding fingerprint image. The image sensor 235 outputs an electric signal, that is, a digital fingerprint image signal corresponding to the inputted fingerprint image to thus acquire an image of the fingerprint placed on the fingerprint input surface 210a.

It has to be noted that in the embodiment of the present invention, a mechanism different from a fingerprint recognition mechanism is employed to distinguish forged fingerprint. Therefore, the fingerprint recognition apparatus 200 according to the embodiments of the present invention is not limited to the example of diffusive type shown in FIG. 2. As mentioned above, the prism 210 is not limited to certain shapes such as shapes having trapezoidal or triangular section, and the internal light source 231 may be placed variously according to the fingerprint recognition method or shape of the prism 210 as employed.

The control unit 250 controls the overall operations regarding the fingerprint recognition apparatus 200 such as, for example, acquisition of fingerprint image.

Additionally, the control unit 250 includes a forged fingerprint distinguishing unit 251 to determine whether the fingerprint contacting the fingerprint input surface 210a is authentic human fingerprint or forged one.

The forged fingerprint distinguishing unit 251 turns on the authentic fingerprint distinguishing light source 270, and then based on a digital fingerprint image signal which is passed through the prism 210 and the optical lens 233 and inputted through the image sensor 235, determines if the fingerprint touching on the fingerprint input surface 210a is forged fingerprint. At this time, the internal light source 231 is controlled to be in off state.

The authentic fingerprint distinguishing light source 270 emits a ray of light toward the fingerprint input surface 210a to distinguish forged fingerprint from authentic fingerprint. The authentic fingerprint distinguishing light source 270 may desirably be the one that has a predetermined viewing angle such as approximately 30° with reference to the light axis.

The light ray emitted from the authentic fingerprint distinguishing light source 270 toward the fingerprint input surface 210a undergoes a predetermined total reflection, absorption, or refraction, before passing through the light emitting surface, and being converged on the optical lens 233 and inputted to the image sensor 235.

If the incident angle of the light axis of the light ray transmitted from the authentic fingerprint distinguishing light source 270 toward the fingerprint input surface 210a is within a predetermined range, the light amount being inputted to the image sensor 235 varies according to whether the fingerprint touching on the fingerprint input surface 210a is authentic human fingerprint or forged one. In other words, depending on the fingerprint type in contact with the fingerprint input surface 210a, the area of the image, which is acquired from the image sensor 235 using the authentic fingerprint distinguishing light source 270, varies. The operation of the authentic fingerprint distinguishing light source 270 and distinguishing the forged fingerprint will be explained in detail below.

In the examples explained above, the fingerprint recognition apparatus 200 of FIG. 2 is embodied to use the prism 210, optical lens 233, and the image sensor 235 for both acquiring fingerprint image and distinguishing forged fingerprint. However, depending on the fingerprint recognition method as employed, the fingerprint recognition apparatus 200 may employ additional optical lens and image sensor to acquire the fingerprint image using the authentic fingerprint distinguishing light source 270.

Furthermore, depending on the embodiments, the internal light source 231 may be omitted, and an independent forged fingerprint apparatus may be employed instead, to determine whether the fingerprint contacting the fingerprint input surface 210a is authentic fingerprint or forged one.

Hereinafter, a method for distinguishing forged fingerprint using the authentic fingerprint distinguishing light source 270 will be explained in detail.

Figure 3A:
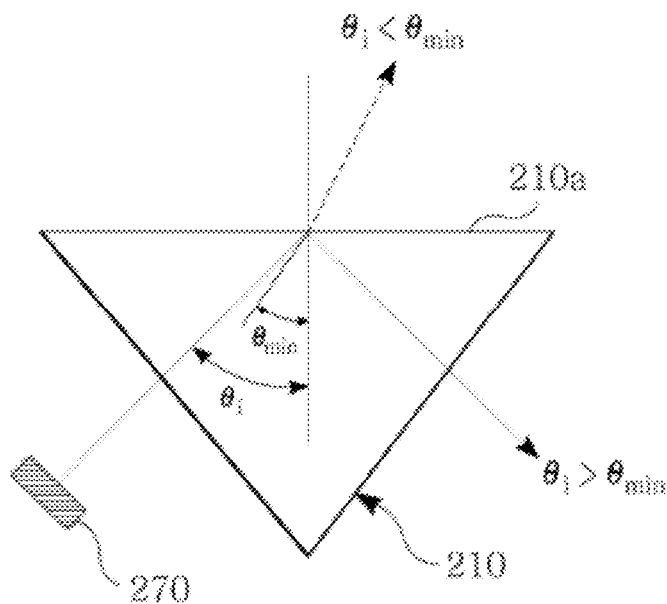
FIGS. 3A and 3B are views provided to explain a method for distinguishing forged fingerprint according to an embodiment of the present invention.
Figure 3B:
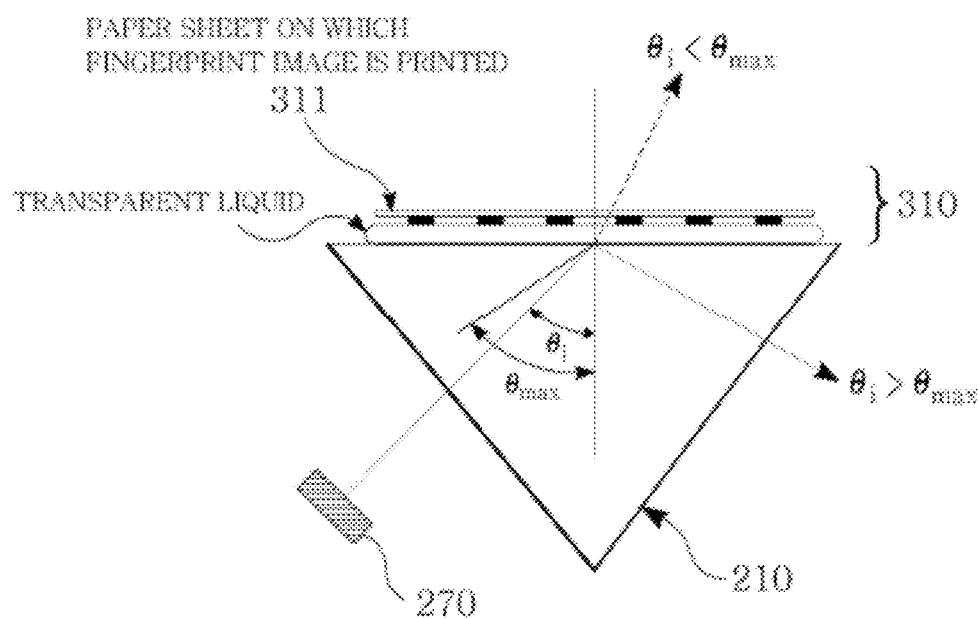

FIGS. 3A and 3B are views provided to explain a method for distinguishing forged fingerprint according to an embodiment of the present invention.

When the refractive index of the prism 210 is $n_1$, and the refractive index of the medium in contact with the fingerprint input surface 210a of the prism 210 is $n_2$, the method of distinguishing forged fingerprint according to the embodiment of the present invention is based on the fact that a threshold angle for total reflection against the fingerprint input surface 210a varies according to whether the fingerprint touching on the fingerprint input surface 210a is authentic fingerprint or forged one.

When a ray of light is emitted from a certain medium toward another medium of smaller refractive index, the light ray is refracted if the incident angle is below a threshold, or undergoes total reflection if the incident angle exceeds the threshold. The threshold is determined based on the refractive indexes of the two adjoining media.

FIG. 3A shows an example where no contact is made against the fingerprint input surface 210a, in which refractive index ($n_2$) is 1, which corresponds to the refractive index of air. For convenience of explanation, the refractive index ($n_1$) of the prism 210 is assumed to be 1.6 in the example discussed below.

According to the Snell's law, the threshold for total reflection can be expressed as:

$$n_1 \sin \theta_1 = n_2 \sin \theta_2 \quad \text{[Formula 1]}$$

where, $\theta_1$ is incident angle, and $\theta_2$ is refractive angle. Therefore, $\theta_2$ for total reflection is 90°.

By applying $n_1=1.6$, $n_2=1$ (refractive index of air) and $\theta_2=90°$ to mathematical expression 1, threshold angle $\theta_{min}$ for total reflection in the case of no contact against the fingerprint input surface 210a ('$\theta_{min}$=first threshold angle') can be expressed as:

$$1.6 \times \sin \theta_{min} = 1.0 \times \sin 90°$$

$$\theta_{min} = \sin^{-1}(1/1.6) \approx 39°$$

Accordingly, if the incident angle ($\theta_i$) of the light ray, which is emitted from the authentic fingerprint distinguishing light source 270 toward the fingerprint input surface 210a, is smaller than the first threshold angle ($\theta_{min}$), the light amount of the light ray, which is refracted against the fingerprint input surface 210a and inputted to the image sensor 235, is decreased significantly. If the incident angle ($\theta_i$) is larger than the first threshold angle ($\theta_{min}$), most of the light ray emitted from the authentic fingerprint distinguishing light source 270 undergoes total reflection and reaches the image sensor 235.

FIG. 3B shows an example where forged fingerprint 310 is touched on the fingerprint input surface 210a. The 'forged fingerprint' herein refers to a paper sheet or a film on which a fingerprint is printed and then transparent liquid such as water or oil is applied or coated. Taking water as an example of the transparent liquid, since water has refractive index 1.33, the threshold angle $\theta_{max}$ ('$\theta_{max}$=second threshold angle') for total reflection in the case where the contacting fingerprint is forged one, can be expressed as:

$$1.6 \times \sin \theta_{max} = 1.33 \times \sin 90°$$

$$\theta_{max} = \sin^{-1}(1.33/1.6) \approx 56°$$

Accordingly, the emitted light ray from the authentic fingerprint distinguishing light source 270 is refracted against the fingerprint input surface 210a if the incident angle $\theta_i$ is smaller than $\theta_{max}$, while the emitted light ray undergoes total reflection against the fingerprint input surface 210a and reaches the image sensor 235 if $\theta_i$ is larger than $\theta_{max}$.

In this situation, since the transparent liquid on the forged fingerprint is brought into contact with almost entire area of the fingerprint input surface 210a to form a liquid layer on, the optical characteristic of forged fingerprint is ignored but becomes optically identical with that of the liquid. As a result, most of the incident light ray that enters at a smaller angle $\theta_i$ than the second threshold angle $\theta_{max}$ is refracted, and a very small amount of the light is inputted to the image sensor 236.

The second threshold angle $\theta_{max}$ may desirably be determined with reference to the one with lower refractive index among the liquids such as water, alcohol, etc that can be used as the transparent liquid for fingerprint forgery. For example, the second threshold angle $\theta_{max}$ may desirably be determined with reference to the water which has a lower refractive index than the other liquids and also simpler to use and easily available.

Hereinafter, an example where the incident angle $\theta_i$ of the ray of light emitted from the authentic fingerprint distinguishing light source 270 is set based on:

$$\theta_{min} \leq \theta_i \leq \theta_{max} \quad \text{[Formula 2]}$$

In the condition of formula 2, while total reflection is very likely on the valleys of authentic fingerprint, the possibility of having total reflection is decreased significantly in the case of forged fingerprint. Therefore, light amount being inputted to the image sensor 235 varies according to authentic fingerprint and forged one. Based on formula 2, it is distinguishable whether the fingerprint touched on the fingerprint input surface 210a is authentic fingerprint or forged one.

Since the 'incident angle $\theta_i$' herein refers to an incident angle of the light axis of the ray of light being emitted from the authentic fingerprint distinguishing light source 270 toward the fingerprint input surface 210a, the position of the authentic fingerprint distinguishing light source 270 depends on the incident angle $\theta_i$ of the emitted light ray from the authentic fingerprint distinguishing light source 270. In other words, the authentic fingerprint distinguishing light source 270 has to be put in position so that the incident angle of the light axis of the emitted light ray meets formula 2. It is desirable that the light axis of the authentic fingerprint distinguishing light source 270 meets the fingerprint input surface 210a at the center of the fingerprint input surface 210a, although this is not strictly limited.

Referring to FIG. 2, the authentic fingerprint distinguishing light source 270 is placed to emit ray of light toward the fingerprint input surface 210a to distinguish forged fingerprint, in which the incident angle of the light axis of the emitted light ray from the authentic fingerprint distinguishing light source 270 meets formula 2.

Accordingly, if forged fingerprint 310 on which water is applied, is used, the incident angle of the authentic fingerprint distinguishing light source 270 may be $39° \leq \theta_i \leq 56°$, and it is most preferable that the incident angle be set to intermediate value, i.e., 48°.

Figure 4A:
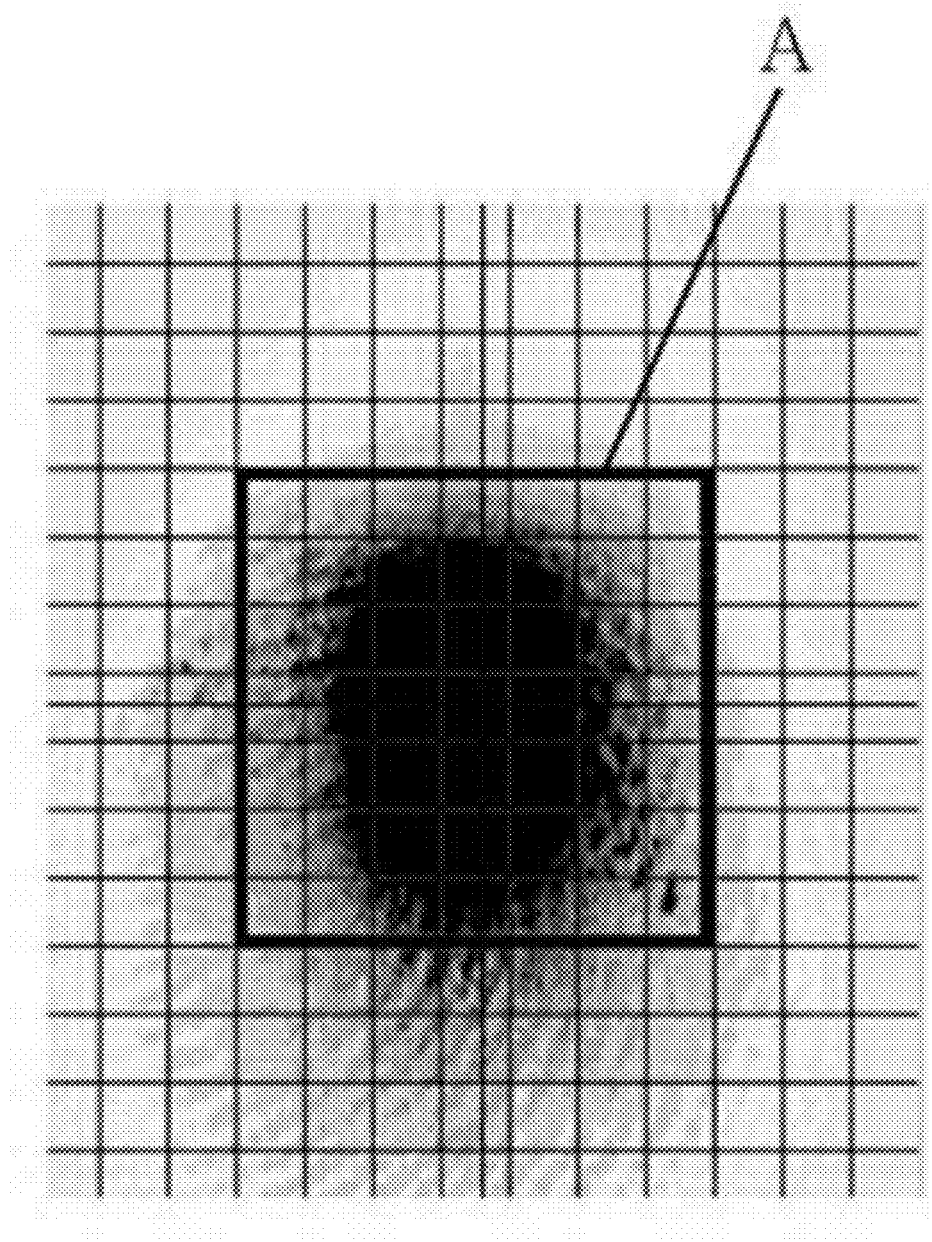
FIGS. 4A and 4B show an image acquired using the light source for distinguishing authentic fingerprint of FIG. 2.
Figure 4B:
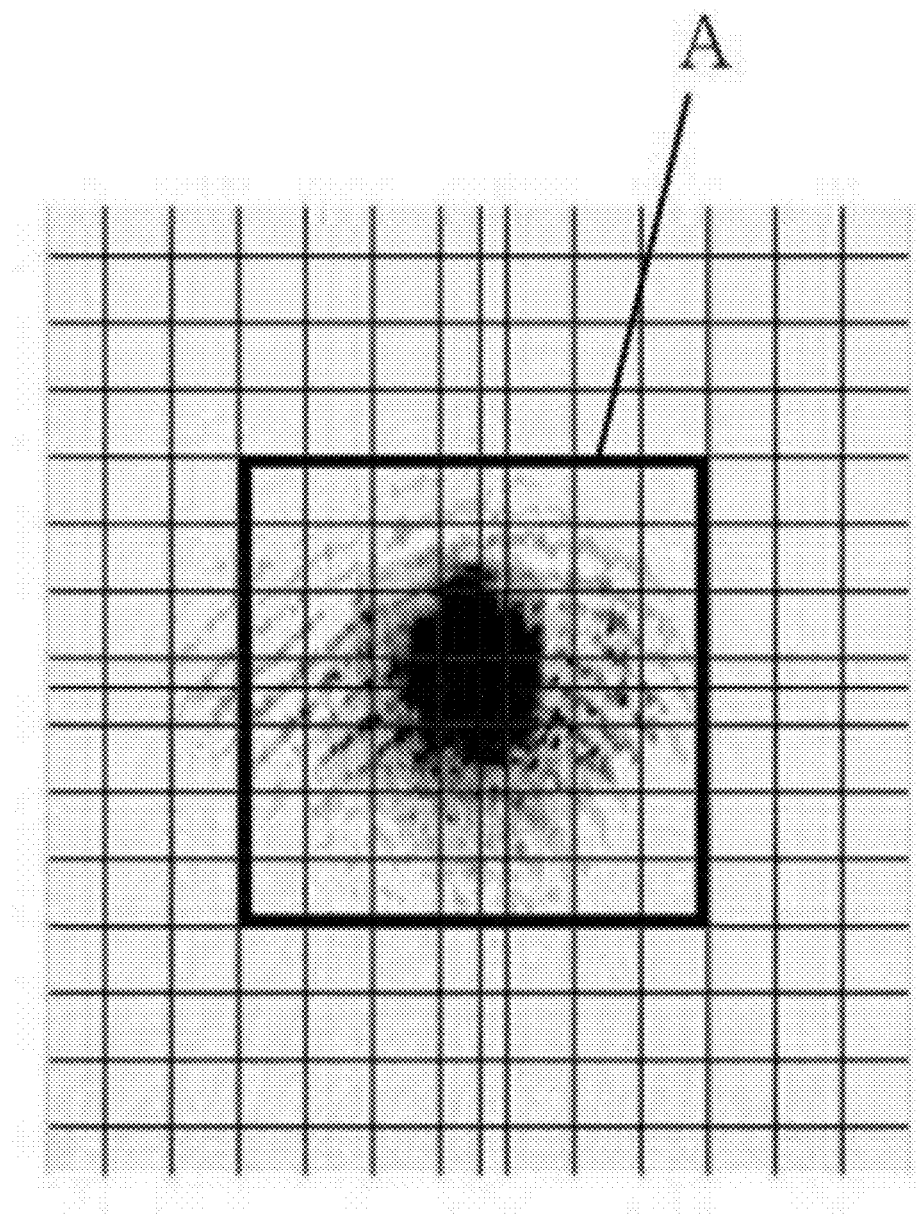

FIGS. 4A and 4B show an image acquired using the authentic fingerprint distinguishing light source 270, in which fingerprint image is included as the entire image which is inputted from the image sensor 235 using the authentic fingerprint distinguishing light source 270. An example of acquiring an image by the image sensor 235 when the light ray emitted from the authentic fingerprint distinguishing light source 270 enters the fingerprint input surface 210a at incident angle 48°, will be explained in detail below with reference to FIGS. 2, 4A and 4B.

When authentic fingerprint is touched on the fingerprint input surface 210a, the paths of light ray emitted from the authentic fingerprint distinguishing light source 270, are different according to the valleys and ridges of the fingerprint. That is, since no contact is made in the areas corresponding to the valleys of the fingerprint, the first threshold angle $\theta_{min}$ applies, and since the incident angle of the emitted light ray from the authentic fingerprint distinguishing light source 270 exceeds the first threshold angle $\theta_{min}$, total reflection occurs. On the other hand, the light rays emitted to the ridges in contact are either absorbed or diffused.

Of course, total reflection does not always occur on the areas corresponding to the valleys of the fingerprint, since the light source generally emits rays of light with a viewing angle approximately of 30° with reference to the light axis. In consideration of the above, the image acquired by the image sensor 235 may not be the exact fingerprint image to be recognized, and FIG. 4A shows an example.

If forged fingerprint is touched on the fingerprint input surface 210a, the second threshold angle $\theta_{max}$ applies to the fingerprint input surface 210a. Since the incident angle of the light ray emitted from the authentic fingerprint distinguishing light source 270 does not exceed the second threshold angle $\theta_{max}$, refraction occurs all over the fingerprint input surface 210a. As a result, a significantly decreased amount of light is inputted to the image sensor 235, and an image such as the exemplary one shown in FIG. 4B is acquired by the image sensor 235.

In comparing the images of FIGS. 4A and 4B, there is a difference between the areas of the fingerprint image acquired (darkened areas). The images of FIGS. 4A and 4B are the inversed images of the entire images being inputted from the image sensor 235. Accordingly, in the actual image acquiring process, the area of the fingerprint image being inputted to the optical lens 233 and the image sensor 235 are brighter than the other areas, since the fingerprint area is where the light ray enters.

Therefore, based on the fingerprint image, the fingerprint recognition apparatus 200 determines whether the fingerprint touched on the fingerprint input surface 210a is authentic fingerprint or forged one.

Hereinafter, a method of distinguishing forged fingerprint using the images such as the ones shown in FIGS. 4A and 4B will be explained in detail with reference to the operation of the forged fingerprint distinguishing unit 251.

The forged fingerprint distinguishing unit 251 determines whether or not the fingerprint touched on the fingerprint input surface 210a is forged fingerprint based on the image inputted from the image sensor 235. That is, the forged fingerprint distinguishing unit 251 relies on the size of the fingerprint image acquired (or on the information generated in accordance with the size of the fingerprint image) to distinguish forged fingerprint.

For example, forged fingerprint may be distinguished if the area of the acquired fingerprint image is smaller than a predetermined threshold, and this is based on the fact that fingerprint images of different areas are acquired by the image sensor 235 according to whether the fingerprint is authentic or forged one.

Figure 5:
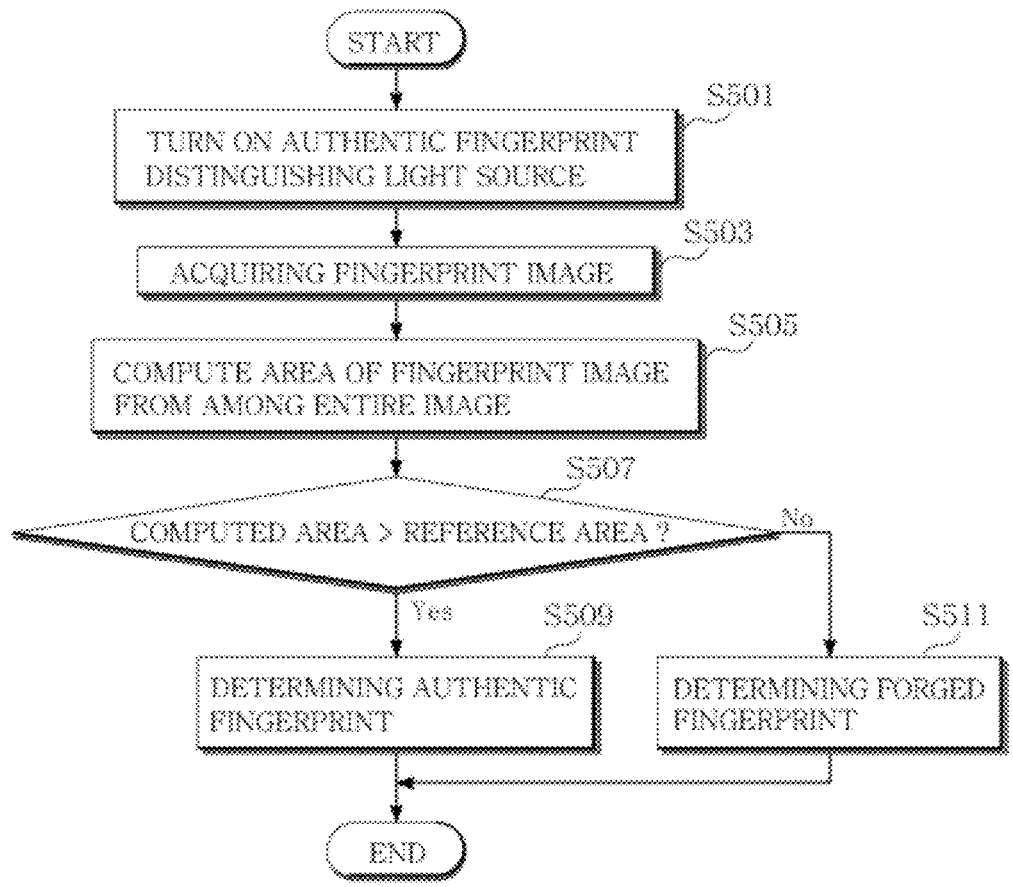
FIG. 5 is a view provided to explain a method for distinguishing forged fingerprint according to an embodiment of the present invention.

FIG. 5 is a view provided to explain an example of a forged fingerprint distinguishing method according to an embodiment of the present invention.

The forged fingerprint distinguishing unit 251 outputs a predetermined control signal to turn on the authentic fingerprint distinguishing light source 270 at S501, if fingerprint is touched on the fingerprint input surface 210a, and receives as an input the entire image, including fingerprint image, through the image sensor 235 at S503.

The forged fingerprint distinguishing unit 251 computes the area of the fingerprint image in the entire image at S505. For example, the above computation may obtain the number of pixels having gray levels which are greater than a threshold level.

The forged fingerprint distinguishing unit 251 determines whether or not the area computed at S505 is larger than a reference area at S507. The 'reference area' herein refers to a value to classify from the authentic fingerprint image and the forged fingerprint image as shown in FIGS. 4A and 4B, and may be empirically obtained.

If determining that the area of the acquired fingerprint image is larger than the reference area at S507, the forged fingerprint distinguishing unit 251 determines authentic fingerprint at S509. The forged fingerprint distinguishing unit 251 determines forged fingerprint at S511, if determining that the area of the acquired fingerprint image is smaller than the reference area at S507.

According to another embodiment of the present invention, the forged fingerprint distinguishing unit 251 may distinguish forged fingerprint without using the determination processes of S507 to S511, by determining whether or not the acquired fingerprint image belongs to a predetermined area range (that is, the area range of the fingerprint image that corresponds to authentic fingerprint).

Meanwhile, the difference of the areas of the acquired fingerprint images corresponds to the difference of average gray levels which are obtained with respect to predetermined areas in the entire image. Therefore, forged fingerprint may also be distinguished by obtaining a gray level of the entire image (or that of a predetermined part of the entire image) being inputted from the image sensor 235 and determining if the obtained gray level is smaller than the threshold level. This threshold level may be different from the threshold levels to determine the presence of an image at S505.

In obtaining an average gray level of a predetermined part of the entire image, it is more preferable to apply the area (such as area A shown in FIGS. 4A and 4B) which is larger than the usual area of the fingerprint image which is obtained empirically regarding forged fingerprint.

The fingerprint image having a larger average gray level than the reference level may be determined to be forged fingerprint, in accordance with whether or not the entire image is inversed.

Figure 6:
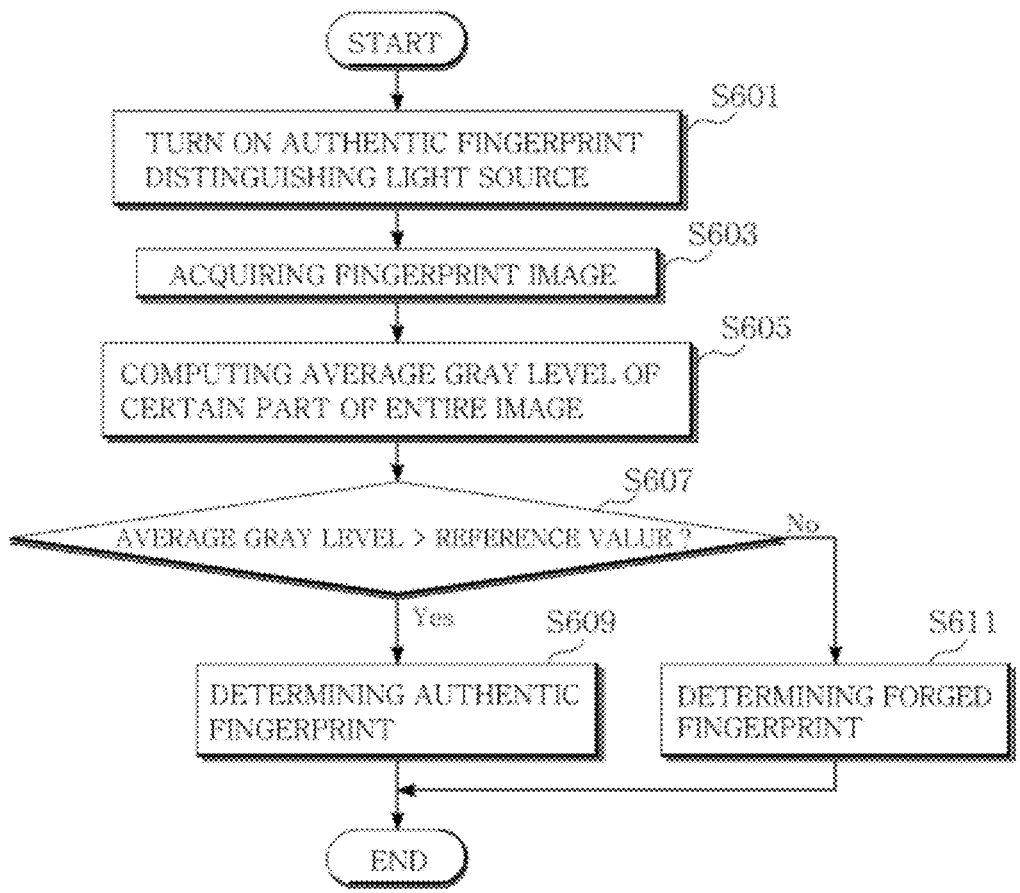
FIG. 6 is a view provided to explain a method for distinguishing forged fingerprint according to another embodiment of the present invention.

FIG. 6 is a view provided to explain another example of forged fingerprint distinguishing method according to an embodiment of the present invention.

The forged fingerprint distinguishing unit 251 outputs a predetermined control signal to turn on the authentic fingerprint distinguishing light source 270 at S601, if fingerprint is touched on the fingerprint input surface 210a, and receives as an input the entire image, including fingerprint image, through the image sensor 235 at S603.

The forged fingerprint distinguishing unit 251 computes an average gray level of a predetermined part of the entire image (such as area A of FIGS. 4A and 4B) at S605, and compares the computed average gray level with a reference value at S607.

If determining that the average gray level is larger than the reference value as a result of the comparison at S607, the forged fingerprint distinguishing unit 251 determines the touching fingerprint to be authentic one at S609, and if not, determines the touching fingerprint to be forged one at S611.

Accordingly, the forged fingerprint distinguishing unit 251 distinguishes whether the acquired fingerprint image is authentic or forged one.

As explained above, the forged fingerprint distinguishing apparatus according to the embodiments of the present invention is capable of distinguishing forged fingerprint efficiently.

The forged fingerprint distinguishing method according to the embodiments of the present invention shows a better performance especially when forged fingerprint is the one that is made by applying transparent liquid on a paper sheet or film on which fingerprint image is printed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of distinguishing forged fingerprint for determining whether an object touched on a fingerprint input surface is authentic fingerprint or forged one, by acquiring a fingerprint image of the touched object, the method comprising:

emitting a ray of light having a light axis at a predetermined incident angle onto the fingerprint input surface, wherein the predetermined incident angle is larger than a first threshold angle for total reflection and smaller than a second threshold angle for total reflection, the first threshold angle for total reflection being applied when the object has a reflective index of 1, and the second threshold angle for total reflection being applied when a transparent liquid is touched on the fingerprint input surface;

acquiring a fingerprint image of the object which is formed by the emitted ray of light;

computing an area of the acquired fingerprint image; and determining the object to be authentic fingerprint if the computed area of the fingerprint image is larger than a reference area, and determining the object to be forged one if the computed area of the fingerprint image is smaller than the reference area.

2. The method of claim 1, wherein the area of the fingerprint image is computed by obtaining the number of pixels which have gray levels greater than a predetermined reference value, in an entire image that includes the acquired fingerprint image.

3. The method of claim 1, wherein the second threshold angle for total reflection is applied when the transparent liquid is water.

4. The method of claim 1, wherein the predetermined incident angle is an intermediate angle between the first and second threshold angles.

5. A method of distinguishing forged fingerprint for determining whether an object touched on a fingerprint input surface is authentic fingerprint or forged one, by acquiring a fingerprint image of the touched object, the method comprising:

emitting a ray of light having a light axis at a predetermined incident angle onto the fingerprint input surface, wherein the predetermined incident angle is larger than a first threshold angle for total reflection and smaller than a second threshold angle for total reflection, the first threshold angle for total reflection being applied when the object has a reflective index of 1, and the second threshold angle for total reflection being applied when a transparent liquid is touched on the fingerprint input surface;

acquiring a fingerprint image of the object which is formed by the emitted ray of light;

computing an average gray level of an entire image that includes the acquired fingerprint image or that of a predetermined part of the entire image; and determining the object to be authentic fingerprint if the computed average gray level is larger than a reference value, and determining the object to be forged one if the computed average gray level is smaller than the reference value.

6. The method of claim 5, wherein the second threshold angle for total reflection is applied when the transparent liquid is water.

7. The method of claim 5, wherein the predetermined incident angle is an intermediate angle between the first and second threshold angles.

8. An apparatus for distinguishing forged fingerprint, comprising:

a light refractor comprising a fingerprint input surface on which an object for acquiring a fingerprint image is touched, and a light emitting surface from which the fingerprint image is emitted;

an authentic fingerprint distinguishing light source provided to emit a ray of light in a manner such that the emitted ray of light has a light axis at a predetermined incident angle with respect to the fingerprint input surface, wherein the predetermined incident angle is larger than a first threshold angle for total reflection and smaller than a second threshold angle for total reflection, the first threshold angle being applied when the object has a reflective index of 1, and the second threshold angle for total reflection being applied when a transparent liquid is touched on the fingerprint input surface;

at least one optical lens provided adjacent to the light emitting surface to focus the fingerprint image being emitted from the light refractor;

an image sensor for acquiring the fingerprint image focused on the optical lens; and a forged fingerprint distinguishing unit for computing an area of the fingerprint image acquired by the image sensor, and determining the object to be authentic fingerprint if the computed area of the fingerprint image is larger than a reference area, or determining the object to be forged one if the computed area of the fingerprint image is smaller than the reference area.

9. The apparatus of claim 8, wherein the forged fingerprint distinguishing unit obtains the area of the fingerprint image by obtaining the number of pixels that have gray levels greater than a predetermined reference value, in an entire image that includes the acquired fingerprint image.

10. The apparatus of claim 8, wherein the second threshold angle for total reflection is applied when the transparent liquid is water.

11. The apparatus of claim 8, wherein the predetermined incident angle is an intermediate angle between the first and second threshold angles.

12. An apparatus for distinguishing forged fingerprint, comprising:

a light refractor comprising a fingerprint input surface on which an object for acquiring a fingerprint image is touched, and a light emitting surface from which the fingerprint image is emitted;

an authentic fingerprint distinguishing light source provided to emit a ray of light in a manner such that the emitted ray of light has a light axis at a predetermined incident angle with respect to the fingerprint input surface, wherein the predetermined incident angle is larger than a first threshold angle for total reflection and smaller than a second threshold angle for total reflection, the first threshold angle being applied when the object has a reflective index of 1, and the second threshold angle for total reflection being applied when a transparent liquid is touched on the fingerprint input surface;

at least one optical lens provided adjacent to the light emitting surface to focus the fingerprint image being emitted from the light refractor;

an image sensor for acquiring the fingerprint image focused on the optical lens; and a forged fingerprint distinguishing unit for computing an average gray level of an entire image that includes the fingerprint image acquired by the image sensor or that of a predetermined part of the entire image, and determining the object to be authentic fingerprint if the computed average gray level is larger than a reference value, or determining the object to be forged one if the computed average gray level is smaller than the reference value.

13. The apparatus of claim 12, wherein the second threshold angle for total reflection is applied when the transparent liquid is water.

14. The apparatus of claim 12, wherein the predetermined incident angle is an intermediate angle between the first and second threshold angles.

* * * * *